(12) United States Patent
Noda

(10) Patent No.: US 11,424,673 B2
(45) Date of Patent: Aug. 23, 2022

(54) POWER SUPPLY CIRCUIT, START-UP CIRCUIT, POWER GENERATING DEVICE, AND ELECTRONIC APPARATUS

(71) Applicant: Panasonic Intellectual Property Management Co., Ltd., Osaka (JP)

(72) Inventor: Masaaki Noda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 37 days.

(21) Appl. No.: 16/972,667

(22) PCT Filed: Aug. 1, 2019

(86) PCT No.: PCT/JP2019/030121
§ 371 (c)(1),
(2) Date: Dec. 7, 2020

(87) PCT Pub. No.: WO2020/075371
PCT Pub. Date: Apr. 16, 2020

(65) Prior Publication Data
US 2021/0249957 A1    Aug. 12, 2021

(30) Foreign Application Priority Data
Oct. 10, 2018 (JP) .............................. JP2018-191978

(51) Int. Cl.
*H02M 1/36* (2007.01)
(52) U.S. Cl.
CPC ..................................... *H02M 1/36* (2013.01)
(58) Field of Classification Search
CPC ....................................................... H02M 1/36
See application file for complete search history.

(56) References Cited

U.S. PATENT DOCUMENTS

2008/0291709 A1    11/2008  Kawasaki
2014/0126254 A1*    5/2014  Al-Shyoukh ....... H02M 1/4258
                                                                  363/49

(Continued)

FOREIGN PATENT DOCUMENTS

EP          3327890 A1    5/2018
JP        2012-055094    3/2012

(Continued)

OTHER PUBLICATIONS

The Extended European Search Report dated Oct. 15, 2021 for the related European Patent Application No. 19872233.2.

(Continued)

*Primary Examiner* — Alex Torres-Rivera
(74) *Attorney, Agent, or Firm* — McDermott Will & Emery LLP

(57) ABSTRACT

A power supply circuit is configured to supply power to a load based on power generated by a power generation element. The power supply circuit includes an input capacitor configured to store the power generated by the power generation element, a voltage conversion circuit including an enable terminal and being configured to output, to the load, an output voltage obtained by converting an input voltage between both ends of the input capacitor, and a starter circuit configured to apply a voltage to the enable terminal of the voltage conversion circuit. The starter circuit is configured to start up the voltage conversion circuit by applying an enable voltage to the enable terminal of the voltage conversion circuit. The voltage conversion circuit is configured to output the output voltage in an operating state after starting up when the input voltage is equal to or higher than a first threshold. The starter circuit is configured to apply the enable voltage to the enable terminal when the input voltage is equal to or higher than a second threshold (Continued)

higher than the first threshold. This power supply circuit can stabilize power supplied to the load.

12 Claims, 10 Drawing Sheets

(56) References Cited

U.S. PATENT DOCUMENTS

| | | | |
|---|---|---|---|
| 2017/0339759 A1* | 11/2017 | Seki | .................... H05B 45/345 |
| 2018/0152100 A1 | 5/2018 | Utsunomiya et al. | |
| 2018/0269784 A1* | 9/2018 | Ueno | .................... H02N 2/181 |
| 2018/0342949 A1 | 11/2018 | Utsunomiya et al. | |

FOREIGN PATENT DOCUMENTS

| | | |
|---|---|---|
| JP | 2015-195651 | 11/2015 |
| JP | 2016-086599 | 5/2016 |
| JP | 2018-085888 | 5/2018 |

OTHER PUBLICATIONS

International Search Report of PCT application No. PCT/JP2019/030121 dated Oct. 29, 2019.

\* cited by examiner

POWER SUPPLY CIRCUIT, START-UP CIRCUIT, POWER GENERATING DEVICE, AND ELECTRONIC APPARATUS

CROSS-REFERENCE TO RELATED APPLICATIONS

This application is a U.S. national stage application of the PCT international application No. PCT/JP2019/030121 filed on Aug. 1, 2019, which claims the benefit of foreign priority of Japanese patent application No. 2018-191978 filed on Oct. 10, 2018, the contents all of which are incorporated herein by reference.

TECHNICAL FIELD

The present disclosure generally relates to a power supply circuit, starter circuit, power generating device, and electronic apparatus, and more particularly to a power supply circuit, starter circuit, power generating device, and electronic apparatus for supplying power to a load.

BACKGROUND ART

PTL1 discloses a conventional power generating device equipped with vibratable power generation element (power generation element).

The power generating device disclosed in PTL1 includes a power supply circuit including a power storage unit, a rectifying circuit, and a DC-DC converter. The power storage unit stores electrical energy generated by the oscillating power generation element. The rectifying circuit rectifies AC voltage generated by the oscillating power generation element. The DC-DC converter converts an output voltage from the power storage unit and outputs it to a control circuit, which is a load.

Power supplied to the load by the power generating device is demanded to stabilize.

CITATION LIST

Patent Literature

PTL1: Japanese Patent Laid-Open Publication No. 2016-86599

SUMMARY

A power supply circuit is configured to supply power to a load based on power generated by a power generation element. The power supply circuit includes an input capacitor configured to store the power generated by the power generation element, a voltage conversion circuit including an enable terminal and being configured to output, to the load, an output voltage obtained by converting an input voltage between both ends of the input capacitor, and a starter circuit configured to apply a voltage to the enable terminal of the voltage conversion circuit. The starter circuit is configured to start up the voltage conversion circuit by applying an enable voltage to the enable terminal of the voltage conversion circuit. The voltage conversion circuit is configured to output the output voltage in an operating state after starting up when the input voltage is equal to or higher than a first threshold. The starter circuit is configured to apply the enable voltage to the enable terminal when the input voltage is equal to or higher than a second threshold higher than the first threshold.

This power supply circuit can stabilize power supplied to the load.

DETAIL DESCRIPTION OF PREFERRED EMBODIMENT

Exemplary embodiments and variations described below are illustrative and the scope of the present disclosure is not restricted by the exemplary embodiments and variations. Other exemplary embodiments and variations, typically related to design, falling within the technical spirit of the present disclosure are also embraced therein.

Figure 1A:
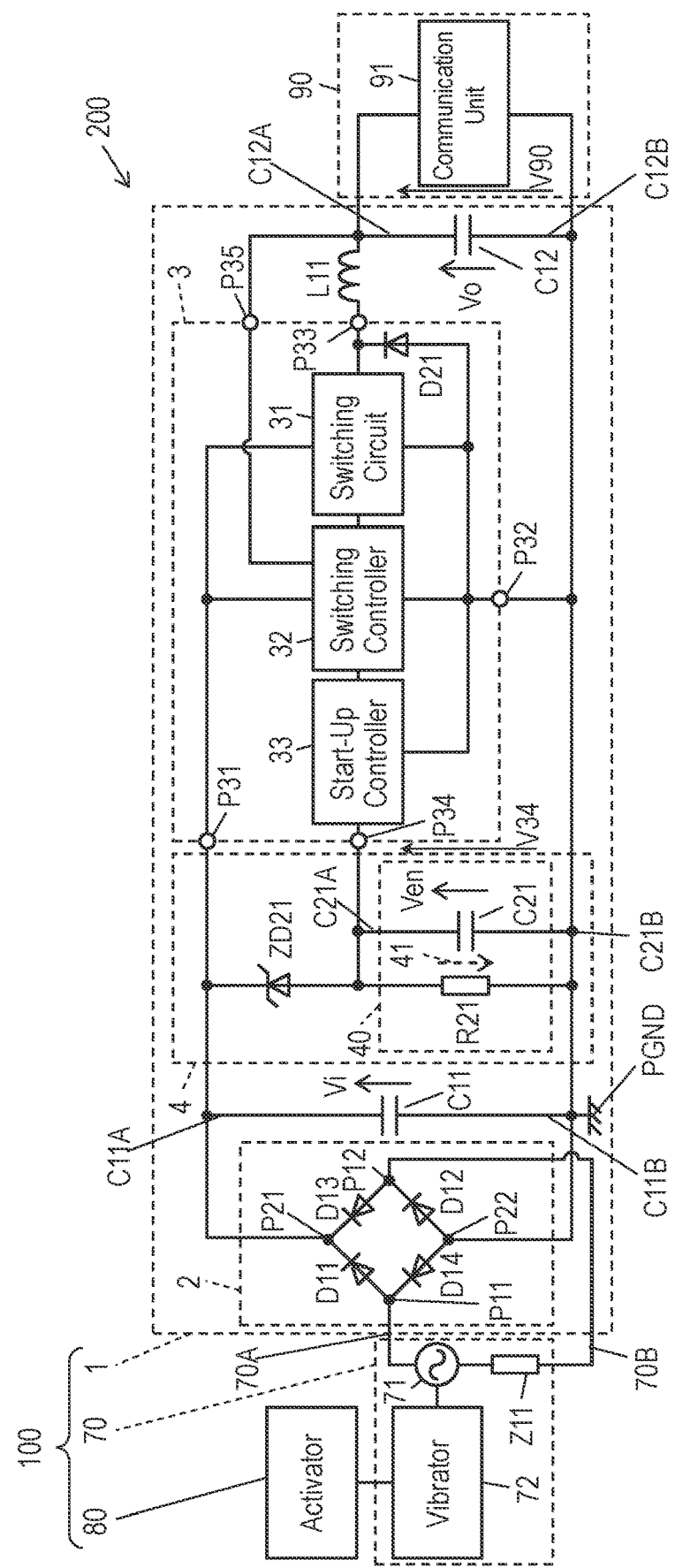
FIG. 1A is a circuit diagram of a power supply circuit in accordance with an exemplary embodiment of the present disclosure.

FIG. 1A is a circuit diagram of power supply circuit 1 in accordance with an exemplary embodiment.

Power supply circuit 1 in accordance with the embodiment is configured to supply power to load 90 based on power generated by power generation element 70. Power generating device 100 in accordance with the embodiment includes power supply circuit 1 and power generation element 70. Electronic apparatus 200 in accordance with the embodiment includes power generating device 100 and load 90. Power generating device 100 is a vibratable power generator configured to generate power by converting vibration energy applied to power generation element 70 into electrical energy. Load 90 is configured to operate with power supplied from power generating device 100.

Power Generation Element

Figure 1B:
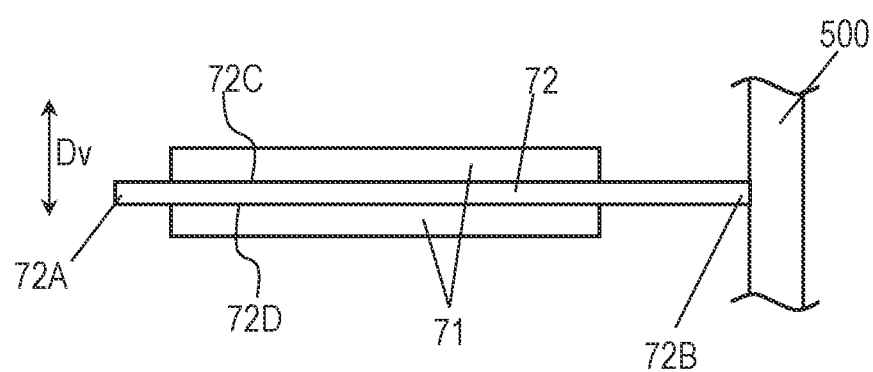
FIG. 1B is a schematic side view of a power generation element of a power generating device in accordance with the embodiment.

FIG. 1B is a schematic side view of power generation element 70. Power generation element 70 includes piezoelectric element 71 and vibrator 72.

Vibrator 72 is made of a resilient plate, e.g. a metal plate, such as a stainless-steel plate. Vibrator 72 has a cantilever structure in which one end 72B of vibrator 72 is a fixed end and another end 72A opposed to end 72B is a free end. Vibrator 72 is held by housing 500 by fixing end 72B, the fixed end, onto housing 500. In vibrator 72, end 72A, the free end, is movable with respect to housing 500 in the thickness direction of vibrator 72, and vibrator 72 is vibratable.

Figure 2:
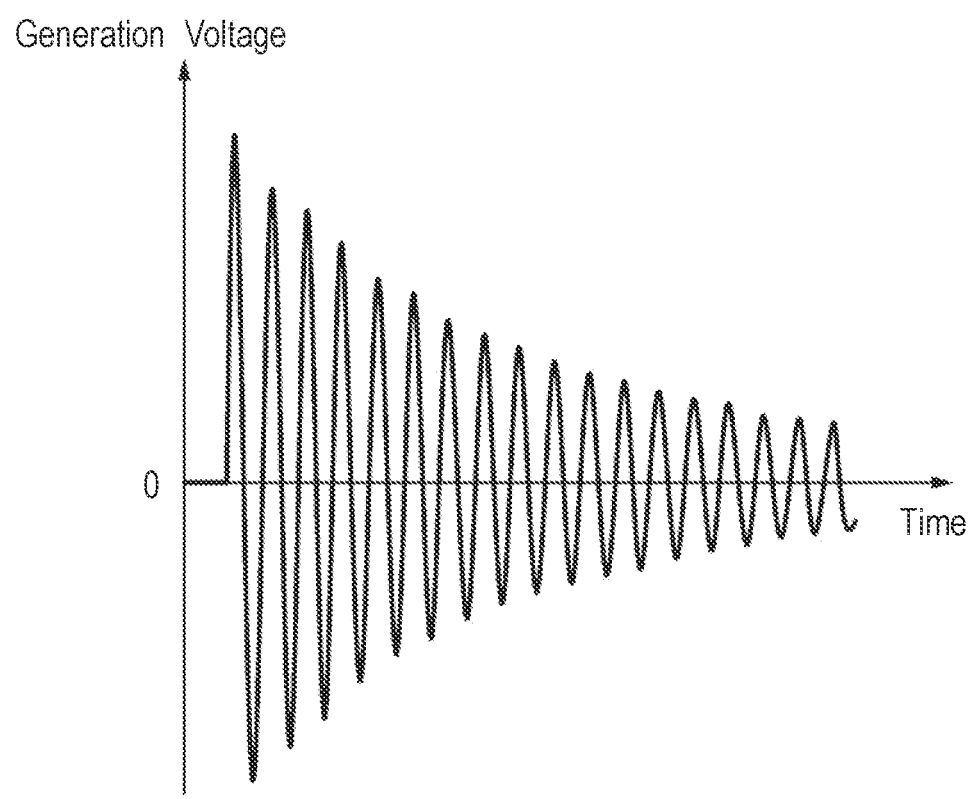
FIG. 2 is a waveform diagram of an output voltage of the power generation element of the power generating device in accordance with the embodiment.

Piezoelectric element 71 is attached to both surfaces 72C and 72D of vibrator 72 in the thickness direction. Vibration of vibrator 72 applies distortion to piezoelectric element 71, and piezoelectric element 71 generates power. In other words, vibration energy generated by vibration of vibrator 72 is converted to electrical energy by piezoelectric element 71. FIG. 2 shows an output voltage (generated voltage) of piezoelectric element 71 when free end 72A of vibrator 72 is flicked in vibrating direction Dv to vibrate vibrator 72. As shown in FIG. 2, piezoelectric element 71 outputs an alternating-current (AC) voltage due to vibration of vibrator 72. An amplitude of the output voltage of piezoelectric element 71 attenuates as time lapses. In other words, an output voltage value of piezoelectric element 71 decreases. Piezoelectric element 71 has internal impedance Z11 (FIG. 1A). Power generation element 70 has output ends 70A and 70B to output the output voltage of piezoelectric element 71 from across output ends 70A and 70B.

Power generating device 100 further includes activator 80. Activator 80 is, for example, a push button movable with respect to the housing. Activator 80 is bend to vibrate vibrator 72 in operation.

In power generating device 100, vibrator 72 is thus bent and vibrates according to movement of activator 80 by operating activator 80, and piezoelectric element 71 generates power. In other words, power generation element 70 generates power every time activator 80 of power generating device 100 is operated 100.

Power Supply Circuit

Power supply circuit 1 includes rectifying circuit 2, voltage conversion circuit, starter circuit 4, input capacitor C11, output capacitor C12, and inductor L11.

Rectifying circuit 2 is electrically connected between output ends of power generation element 70, and receives the AC voltage output from power generation element 70. Rectifying circuit 2 is a full-wave rectifying circuit having four bridge-connected diodes D11 to D14. Rectifying circuit 2 full-wave rectifies the output voltage (AC voltage) from power generation element 70, and outputs the rectified voltage to input capacitor C11.

Rectifying circuit 2 includes a pair of input terminals P11 and P12, and a pair of output terminals P21 and P22. Here, the term, "terminal" is not necessarily a component to be connected to a wire or the like. For example, the terminal may be a lead wire of an electronic component or a part of conductors of a circuit board.

Input terminal P11 is electrically connected to one output end 70A of power generation element 70 while input terminal P12 is electrically connected to another output end 70B of power generation element 70. Output terminal P21 is electrically connected to one end C11A of input capacitor C11 while output terminal P22 is electrically connected to another end C11B of input capacitor C11. Output terminal P22 is also electrically connected to circuit ground PGND.

The anode of diode D11 is electrically connected to input terminal P11 while the cathode thereof is electrically connected to output terminal P21. The anode of diode D12 is electrically connected to output terminal P22 while the cathode thereof is electrically connected to input terminal P12. The anode of diode D13 is electrically connected to input terminal P12 while the cathode thereof is electrically connected to output terminal P21. The anode of diode D14 is electrically connected to output terminal P22 while the cathode thereof is electrically connected to input terminal P11. Diodes D11-D14 are bridge-connected to constitute a full-wave rectifying circuit.

Rectifying circuit 2 is not necessarily a full-wave rectifying circuit, but may be a half-wave rectifying circuit.

Figure 3A:
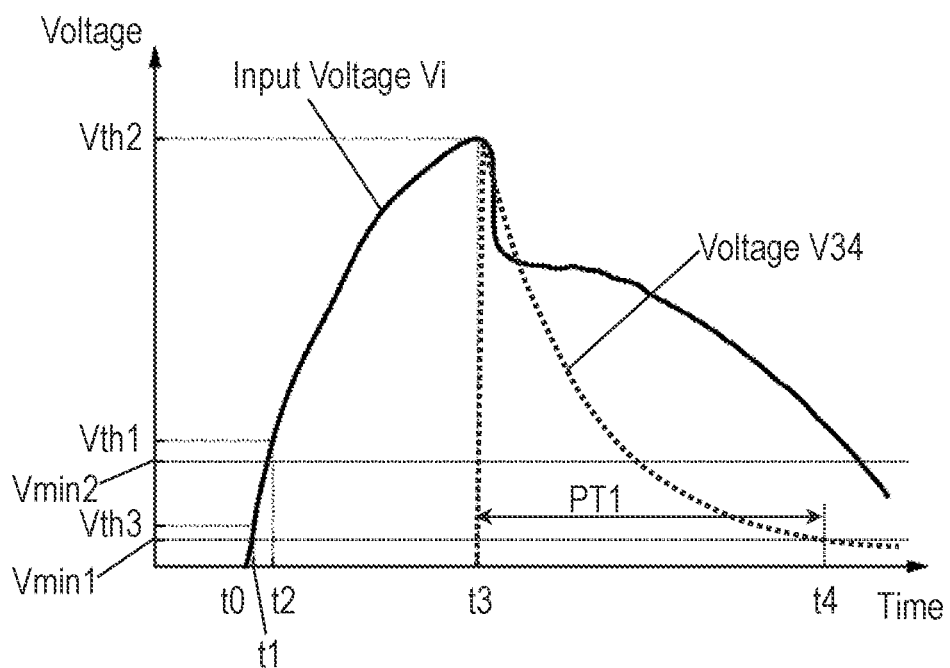
FIG. 3A illustrates an operation of the power supply circuit in accordance with the embodiment.

Input capacitor C11 is electrically connected to output terminals P21 and P22 between output terminals P21 and P22 of rectifying circuit 2 to receive an output voltage of rectifying circuit 2. In other words, input capacitor C11 receives a pulsating voltage obtained by full-wave rectifying the output voltage of power generation element 70 by rectifying circuit 2. Input capacitor C11 stores power generated by power generation element 70 and input via rectifying circuit 2. This configuration generates direct-current (DC) input voltage Vi across both ends C11A and C11B of input capacitor C11. FIG. 3A shows a change of input voltage Vi of input capacitor C11 with respect time.

Voltage conversion circuit 3 is electrically connected to input capacitor C11, and receives input voltage Vi. Voltage conversion circuit 3 is a DC/DC converter circuit to convert input voltage Vi into predetermined output voltage Vo and output voltage Vo to load 90. In other words, voltage conversion circuit 3 obtains predetermined output voltage Vo by converting input voltage Vi and outputs the converted voltage to load 90.

Voltage conversion circuit 3 includes switching circuit 31, switching controller 32, start-up controller 33, and diode D21. In the exemplary embodiment, voltage conversion circuit 3 is configured with IC (integrated circuit). In other words, switching circuit 31, switching controller 32, start-up controller 3, and diode D21 are integrated into single IC. Voltage conversion circuit 3 has input terminal P31, ground terminal P32, output terminal P33, enable terminal P34, and feedback terminal P35.

Input terminal P31 is electrically connected to one end C11A, a positive electrode side, of input capacitor C11. Ground terminal P32 is electrically connected to another end C11B, a negative electrode side of input capacitor C11, and circuit ground PGND. In other words, input capacitor C11 is electrically connected to input terminal P31 and ground terminal P32 between input terminal P31 and ground terminal P32, and input voltage Vi is applied between both ends C11A and C11B of input capacitor C11, that is, between input terminal P31 and ground terminal P32. Output terminal P33 is electrically connected to one end C12A of output capacitor C12 via inductor L11. Another end C12B of output capacitor C12 is electrically connected to circuit ground PGND. Enable terminal P34 is electrically connected to starter circuit 4. Starter circuit 4 will be described later. Feedback terminal P35 is electrically connected to one end C12A of output capacitor C12.

Switching circuit 31 is a chopper circuit with a switching element implemented by, for example, Metal Oxide Semiconductor Field Effect Transistor (MOSFET). Switching circuit 31 is electrically connected to one end C11A and another end C11B of input capacitor C11 via input terminal P31 and ground terminal P32, respectively. Input voltage Vi is input via input terminal P31. Switching circuit 31 is also electrically connected to output capacitor C12 via output terminal P33 and inductor L11. Switching circuit 31 performs voltage conversion to convert a voltage value of input voltage Vi to a predetermined value, and outputs the voltage with the converted value to output capacitor C12 by turning on and off the switching element. In other words, output capacitor C12 stores an output voltage of voltage conversion circuit 3 (switching circuit 31). This configuration generates DC output voltage Vo across both ends C12A and C12B of output capacitor C12. Switching controller 32 controls the switching element of switching circuit 31.

Diode D21 is electrically connected to output terminal P33 and ground terminal P32 between output terminal P33 and ground terminal P32. Diode D21 is a regenerative diode. The anode of diode D21 is electrically connected to ground terminal P32 while the cathode thereof is electrically connected to output terminal P33.

Load 90 is electrically connected to both ends C12A and C12B of output capacitor C12 between ends C12A and C12B of output capacitor C12. Accordingly, output voltage Vo between both ends C12A and C12B of output capacitor C12 is applied to load 90.

Load 90 in accordance with the embodiment is accommodated in a housing together with power generating device 100. In other words, load 90 and power generating device 100 are integrally provided in electronic apparatus 200 in accordance with the embodiment. Load 90 is configured to operate by power generating device 100 as a driving power source. Load 90 has communication unit 91. Communication unit 91 is configured to send signals, using power supplied from power supply circuit 1. In accordance with the embodiment, communication unit 91 is configured to send, to an external device, a radio signal, utilizing radio wave as a medium. Power generating device 100 may further include plural activators 80. In this case, communication unit 91 is preferably configured to output a radio signal that specifies activator 80 operating out of plural activators 80.

Load 90 may also be provided in a housing separate from power generating device 100. Communication unit 91 may be configured to output a signal by wired communication. Load 90 may have a structure not equipped with communication unit 91. For example, load 90 may be configured to generate sound, light, and so on, using power supplied from power generating device 100.

Switching controller 32 performs switch control to control the switching element of switching circuit 31. In the switch control, switching controller 32 controls the switching element of switching circuit 31 such that an output voltage value of switching circuit 31 becomes a predetermined value (e.g., 1.8 V). In other words, switching controller 32 performs constant voltage control of switching circuit 31.

Switching controller 32 is electrically connected to feedback terminal P35. Switching controller 32 monitors output voltage Vo between both ends C12A and C12B of output capacitor C12 via feedback terminal P35. In other words, switching controller 32 monitors a voltage applied to load 90 by monitoring output voltage Vo of output capacitor C12. Switching controller 32 stops the switch control when voltage V90 applied to load 90 exceeds upper output limit Vomax. This configuration causes switching circuit 31 to stop voltage conversion, and stop the output voltage output from switching circuit 31. Controller 32 starts (restart) the switch control when the voltage applied to load 90 falls below lower output limit Vomin. This configuration causes switching circuit 31 to start voltage conversion, allowing switching circuit 31 to start to output voltage Vo. In other words, switching controller 32 executes and stops the switch control repetitively so that voltage applied to load 90 changes between lower output limit Vomin and upper output limit Vomax.

Start-up controller 33 controls start and stop of switching controller 32. Switching controller 32 performs the switch control in an operation state after start-up. When the switching controller 32 is in a stop state, output terminal P33 is short-circuited to ground terminal P32. At this moment, input terminal P31 is electrically disconnected from output terminal P33.

Start-up controller 33 controls start and stop of switching controller 32 according to voltage V34 applied to enable terminal P34. FIG. 3A shows voltage V34 and input voltage Vi. Start-up controller 33 monitors voltage V34 applied to enable terminal 34, that is, voltage V34 between enable terminal P34 and ground terminal P32. Start-up controller 33 starts switching controller 32 when a voltage value of voltage V34 applied to enable terminal P34 exceeds threshold Vth3 (FIG. 3A). Threshold Vth3 is, for example, 0.8 V. Start-up controller 33 stops switching controller 32 when a voltage value of voltage V34 applied to enable terminal P34 falls below predetermined lower operation limit Vmin1 lower than threshold Vth3. Lower operation limit Vmin1 is, for example, 0.4 V. Lower operation limit Vmin1 is not necessarily lower than threshold Vth3, and may be equal to threshold Vth3 or higher than threshold Vth3.

Switching controller 32 monitors input voltage Vi input in the operation state. Switching controller 32 performs the switch control in the operation state while a voltage value of input voltage Vi exceeds threshold Vth1 (FIG. 3A). Threshold Vth1 is higher than threshold Vth3. Threshold Vth1 is, for example, 2.5 V. Switching controller 32 stops the switch control when a voltage value of input voltage Vi falls below predetermined lower operation limit Vmin2 lower than threshold Vth1. Lower operation limit Vmin2 is, for example, 1.8 V. Lower operation limit Vmin2 is not necessarily lower than threshold Vth1, and may be equal to threshold Vth1 or higher than threshold Vth1. In other words, voltage conversion circuit 3 outputs output voltage Vo in the operation state after start-up while input voltage Vi is equal to or higher than threshold Vth1. Voltage conversion circuit 3 outputting output voltage Vo stops outputting output voltage Vo when input voltage Vi falls below lower operation limit Vmin2.

In other words, in voltage conversion circuit 3, start-up controller 33 starts up switching controller 32 when voltage V34 applied to enable terminal P34 exceeds threshold Vth3. In the operation state after start-up, switching controller 32 performs the switch control when input voltage Vi applied to input terminal P31 is equal to or higher than threshold Vth1. The switch control allows switching circuit 31 to convert input voltage Vi by the voltage conversion operation, and outputs obtained output voltage Vo. Through this operation, power is supplied to load 90, and load 90 starts its operation. An operation of voltage conversion circuit 3 will be detailed later in an operation example section.

Starter circuit 4 is configured to apply voltage V34 to enable terminal P34 of voltage conversion circuit 3. Voltage V34 may become enable voltage Ven. Starter circuit 4 is electrically connected to input capacitor C11 and voltage conversion circuit 3. Starter circuit 4 applies enable voltage Ven to enable terminal P34 when input voltage Vi between both ends C11A and C11B of input capacitor C11 is equal to or higher than threshold Vth2 (FIG. 3A). Enable voltage Ven in accordance with the embodiment is a voltage value equal to or higher than threshold Vth3, and is voltage V34 applied to enable terminal P34 of voltage conversion circuit 3.

Starter circuit 4 includes Zener diode ZD21 and time constant circuit 40. Time constant circuit 40 includes resistor R21 and capacitor C21.

A series circuit of Zener diode ZD21 and resistor R21 connected in series to each other is electrically connected to both ends of input capacitor C11 between both ends of input capacitor C11. Zener diode ZD21 has a cathode electrically connected to end C11A on the positive electrode side of input capacitor C11, and an anode electrically connected to end C11B on the negative electrode side of input capacitor C11, which is circuit ground PGND, via resistor R21. Capacitor C21 is electrically connected in parallel to resistor R21 in parallel. Capacitor C21 has one end C21A electrically connected to enable terminal P34 of voltage conversion circuit 3 and another end C21B electrically connected to ground terminal P32 of voltage conversion circuit 3. A voltage between both ends C21A and C21B of capacitor C21 is applied to enable terminal P34 as voltage V34 that may become enable voltage Ven.

End C11B of input capacitor C11 has potential lower than end C11A. The cathode of Zener diode ZD21 is connected to end C11A of input capacitor C11. The anode of Zener diode ZD21 is connected to enable terminal P34.

Capacitor C21 of time constant circuit 40 is connected in series to enable terminal P34 and end C11B of input capacitor C11. Resistor R21 of time constant circuit 40 is connected in parallel to capacitor C21.

A value of breakdown voltage of Zener diode ZD21 is set to threshold Vth2. Accordingly, when input voltage Vi of input capacitor C11 is equal to or higher than threshold Vth2, Zener diode ZD21 is turned on (breakdown state). While Zener diode ZD21 is turned on, a current is supplied from input capacitor C11 to capacitor C21 via Zener diode ZD21 to charge capacitor C21. As being charged, capacitor C21 allows a voltage value of enable voltage Ven, which is voltage V34, between both ends C21A and C21B of capacitor C21 to reach equal to or higher than threshold Vth3, and start-up controller 33 starts switching controller 32.

When input voltage Vi of input capacitor C11 is less lower threshold Vth2, Zener diode ZD21 is turned off. While Zener diode ZD21 is turned off, a current from input capacitor C11 to capacitor C21 is shut off by Zener diode ZD21, and therefore capacitor C21 is not charged. At this moment, when capacitor C21 is already charged, capacitor C21 is discharged via resistor R21. In other words, resistor R21 constitutes discharge route 41 for discharging capacitor C21. Thus, starter circuit 4 includes discharge route 41 for discharging capacitor C21.

Charges are stored in capacitor C21 immediately after Zener diode ZD21 is turned off due to input voltage Vi of input capacitor C11 falling below threshold Vth2. As shown in FIG. 3A, this retains a state that a voltage value of enable voltage Ven, which is voltage V34 between both ends C21A and C21B of capacitor C2, is equal to or higher than threshold Vth3. Accordingly, switching controller 32 is in the operation state during voltage-sustaining period PT1 from time point t3 at which input voltage Vi falls below threshold Vth2 to time point t4 at which enable voltage Ven falls below lower operation limit Vmin1 by discharging capacitor C21. Voltage-sustaining period PT1 is determined by time constant circuit 40. The length of voltage-sustaining period PT1 is determined by time constant based on a capacitance of capacitor C21 and a resistance of resistor R21. In accordance with the embodiment, the capacitance of capacitor C21 and the resistance of resistor R21 is determined such that voltage-sustaining period PT1 becomes about 20 msec.

Figure 3B:
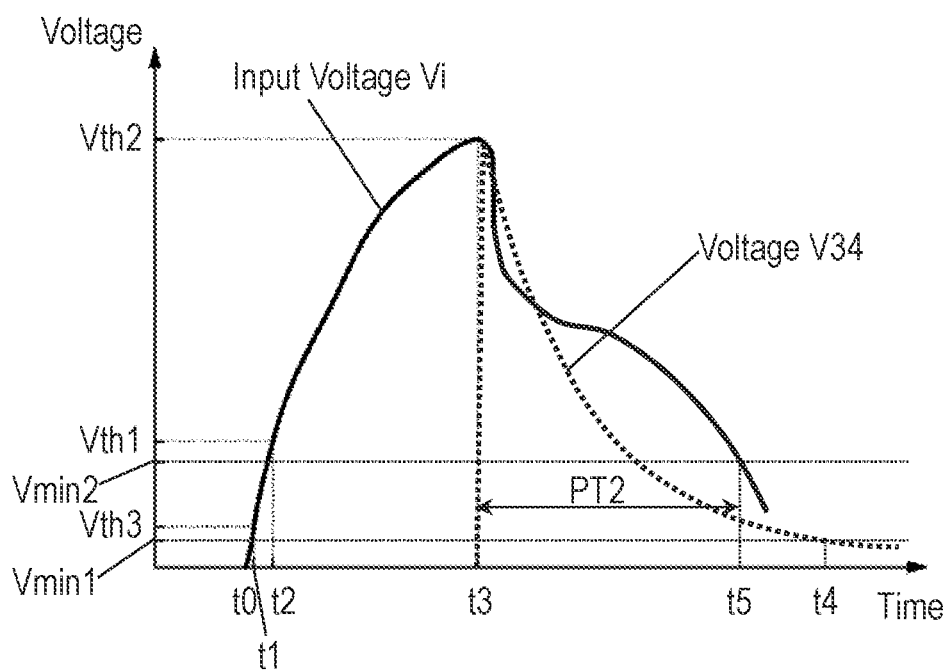
FIG. 3B illustrates another operation of the power supply circuit in accordance with the embodiment.

Voltage-sustaining period PT1 is determined by the above time constant regardless of the charge state of input capacitor C11 and power consumption by load 90. Therefore, input voltage Vi may excessively decrease before the end of voltage-sustaining period PT1 depending on the charge state of input capacitor C11 and power consumption of load 90. Continuous operation of voltage conversion circuit 3 in this condition makes output voltage Vo unstable, and may result in a detrimental effect on load 90. In power supply circuit 1 in accordance with the embodiment, the operation of switching circuit 31 is stopped due to aforementioned lower operation limit Vmin2. This operation is shown in FIG. 3B. Switching controller 32 monitors input voltage Vi in the operation state. Switching controller 32 stops the switch control to stop switching circuit 31 and stop outputting output voltage Vo when input voltage Vi falls below predetermined lower operation limit Vmin2 at time point t5 even during voltage-sustaining period PT1. Thus, in power supply circuit 1, while voltage conversion circuit 3 is started and operates, the operation of switching circuit 31 is stopped to stop outputting output voltage Vo in response to at least one of the case that voltage V34 falls below lower operation limit Vmin1 and that case that input voltage Vi falls below lower operation limit Vmin2.

Operation Example

An example of the operation of power supply circuit 1 in accordance with the embodiment will be described below with reference to FIG. 2 and FIG. 3A. FIG. 3A shows changes of input voltage Vi of input capacitor C11 over time.

At time point to, activator is operated. This causes vibrator 72 to vibrate to generate power by piezoelectric element 71. In other words, power generation element 70 starts power generation. The starting of the power generation by power generation element 70 charges input capacitor C11 and increases input voltage Vi.

At time point t0, input voltage Vi reaches threshold Vth3. Threshold Vth3 is lower than threshold Vth2 that is the breakdown voltage of Zener diode ZD21. Zener diode ZD21 is therefore turned off at time point t0, and therefore, capacitor C21 is not charged. Accordingly, a voltage value of voltage V34 applied to enable terminal P34 of voltage conversion circuit 3 is equal to or lower than threshold Vth3, and voltage conversion circuit 3 (switching controller 32) is stopped.

At time point t2, input voltage Vi reaches threshold Vth1. Threshold Vth1 is lower than threshold Vth2 that is the breakdown voltage value of Zener diode ZD21. Accordingly, at time point t2, Zener diode ZD21 is turned off and capacitor C21 is not charged. Therefore, a voltage value of voltage V34 applied to enable terminal P34 of voltage conversion circuit 3 is equal to or lower than threshold Vth3, and voltage conversion circuit 3 (switching controller 32) is still stopped.

In other words, at time point t2, a voltage value of input voltage Vi input to voltage conversion circuit 3 reaches threshold Vth1 that enables switching controller 32 to perform the switch control, but start-up controller 33 keeps switching controller 32 stopped. Therefore, switching circuit 31 of voltage conversion circuit 3 does not perform voltage conversion, and therefore, no output voltage is output from voltage conversion circuit 3. Accordingly, load 90 is stopped.

At time point t3, input voltage Vi reaches threshold Vth2. Then, Zener diode ZD21 is turned on and capacitor C21 is charged. This increases voltage V34 across both ends C21A and C21B of capacitor C21, and voltage V34 exceeds threshold Vth3. When a voltage value of voltage V34 applied to enable terminal P34 exceeds threshold Vth3, voltage V34 starts start-up controller 33 as enable voltage Ven, and start-up controller 33 starts switching controller 32. Activated switching controller 32 determines whether or not input voltage Vi applied to input terminal P31 is equal to or higher than threshold Vth1. When switching controller 32 is activated, input voltage Vi is already equal to or higher than threshold Vth1, and therefore switching controller 32 starts the switch control. This configuration allows switching circuit 31 to start the voltage conversion, and voltage conversion circuit 3 outputs an output voltage. In other words, power supply to load 90 starts. Load 90 operates by power supplied from voltage conversion circuit 3. In according to the embodiment, communication unit 91 outputs radio signals.

After time point t3, voltage conversion circuit 3 and load 90 starts to operate, and input voltage Vi decreases due to power consumption in voltage conversion circuit 3 and load 90. Input voltage Vi then falls below threshold Vth2 and Zener diode ZD21 is turned off. During voltage-sustaining period PT1 after Zener diode ZD21 is turned off, charges stored in capacitor C21 retain a voltage value of voltage V34, as enable voltage Ven, between both ends C21A and C21B of capacitor C21 at equal to or higher than threshold Vth3. Accordingly, voltage conversion circuit 3 and load 90 continuously operate.

As described above, power generation by power generation element 70 starts and input capacitor C11 is charged by operating activator 80 of electronic apparatus 200 in accordance with the embodiment. Then, starter circuit 4 starts voltage conversion circuit 3 while input capacitor C11 is sufficiently charged, i.e., input voltage Vi reaches threshold Vth2 or above, to start power supply to load 90.

In other words, voltage conversion circuit 3 is not operated and power is not supplied to load 90 when an output voltage (FIG. 2) is high in the initial power generation period of power generation element 70 until time point t3. This increases load impedance in power generation element 70 to achieve impedance matching by reducing a difference between internal impedance Z11 and load impedance of power generation element 70. As a result, input capacitor C11 can be further efficiently charged. Furthermore, voltage conversion circuit 3 is started after input capacitor C11 is sufficiently charged to start power supply to load 90. Power supply to load 90 can be stabilized to stabilize the operation of load 90.

Since power is supplied to load 90 after starting voltage conversion circuit 3, load impedance in power generation element 70 becomes relatively small compared to that before start-up of voltage conversion circuit 3. As a result, a difference between internal impedance Z11 and load impedance of power generation element 70 increases, resulting in decreasing efficiency of charging power to input capacitor C11. However, as shown in FIG. 2, the output voltage in the latter power generation period is lower (attenuated) than that in the initial power generation period. Accordingly, a percentage of power generation in the latter power generation period is small in the entire power generation. This can suppress an impact of the above impedance difference on overall efficiency of extracting generated power.

Switching controller 32 of voltage conversion circuit 3 stops the switch control when voltage V90 supplied to load 90, i.e., output voltage Vo between both ends C12A and C12B of output capacitor C12, exceeds upper output limit Vomax. Accordingly, when power consumption by load 90 is small, a voltage value of output voltage Vo of output capacitor C12 reaches upper output limit Vomax so that switching controller 32 stops the operation of voltage conversion circuit 3. While voltage conversion by voltage conversion circuit 3 is stopped, input capacitor C11 is charged by power generated by power generation element 70. By stopping voltage conversion performed by voltage conversion circuit 3, load impedance of power generation element 70 increases. This reduces a difference between internal impedance Z11 and load impedance of power generation element 70 and improves efficiency of extracting power generated by power generation element 70.

In electronic apparatus 200 in accordance with the embodiment, power generation element 70 generates power every time activator 80 is operated. Accordingly, when activator 80 is repeatedly operated, power generation element 70 intermittently generates power to intermittently charge input capacitor C11. As described above, to start voltage conversion circuit 3 in the state input capacitor C11 is sufficiently charged, voltage conversion circuit 3 needs to be stopped between the operations of activator 80.

Figure 4:
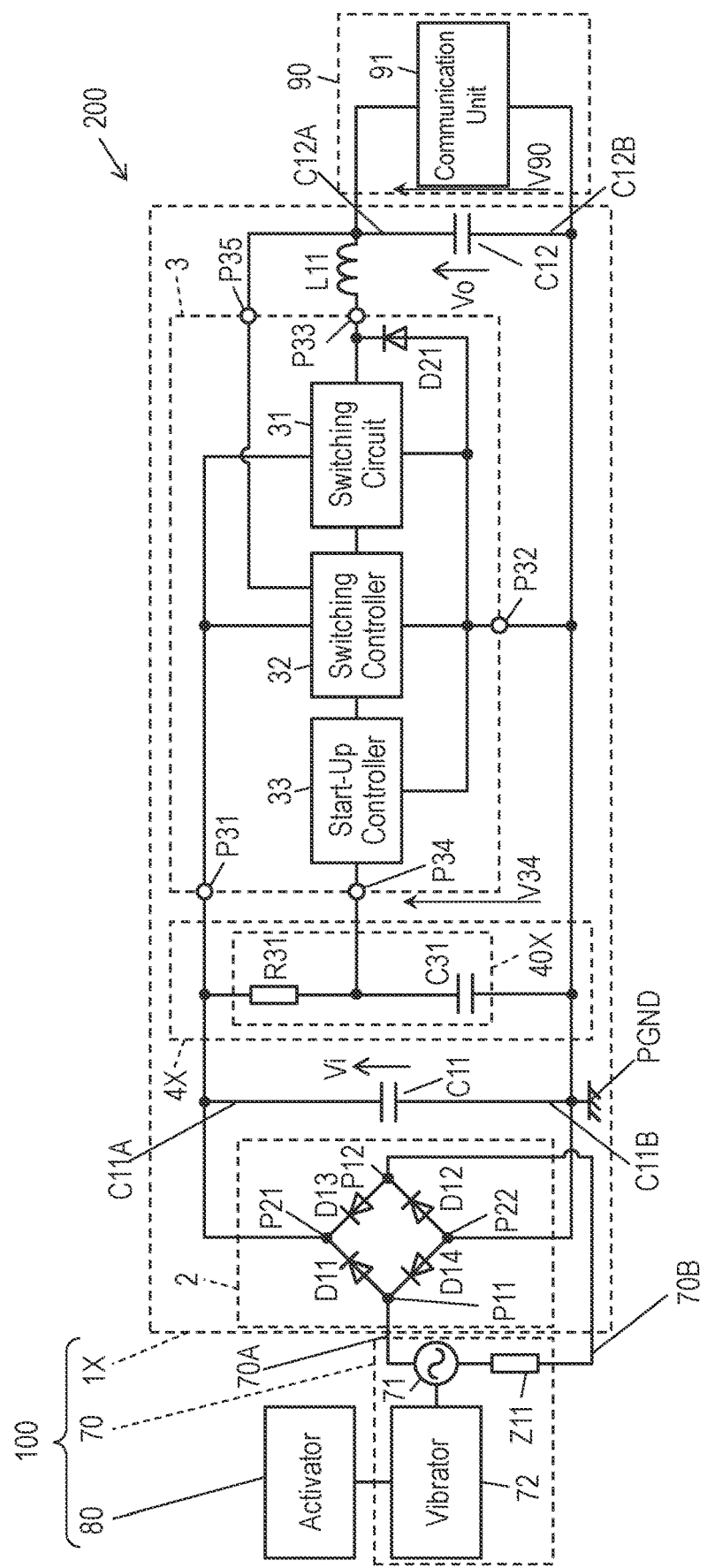
FIG. 4 is a circuit diagram of a comparative example of a power supply circuit.

FIG. 4 shows a circuit diagram of power supply circuit 1X as a comparative example. Power supply circuit 1X in the comparative example is different from power supply circuit 1 according to the embodiment in a configuration of starter circuit 4X. Components identical to those of power supply circuit 1 in the embodiment are denoted by the same reference numerals, and their duplicate description will be omitted.

Starter circuit 4X as the comparative example includes delay circuit 40X. Delay circuit 40X includes resistor R31 and capacitor C31. A series circuit of resistor R31 and capacitor C31 connected in series to each other is electrically connected between both ends of input capacitor C11. A voltage across capacitor C31 is applied to enable terminal p34 of voltage conversion circuit 3.

In power supply circuit 1X as the comparative example, delay circuit 40X delays an increase of a voltage applied to enable terminal P34 of voltage conversion circuit 3 against an increase of input voltage Vin of input capacitor C11. This can delay starting of voltage conversion by voltage conversion circuit 3 to stabilize power supplied to load 90, thereby stabilizing an operation of load 90.

However, power supply circuit 1X as the comparative example does not include a discharge route for discharging input capacitor C11 and capacitor C31. When activator 80 is repeatedly operated, input capacitor C11 and capacitor C31 are not discharged between operations of activator 80, and the operation of voltage conversion circuit 3 may continue. When voltage conversion circuit 3 performs voltage conversion while input capacitor C11 is not sufficiently charged, the voltage conversion operation may become unstable, and thus power supplied to load 90 may become unstable.

In power supply circuit 1 in accordance with the embodiment, starter circuit 4 includes resistor R21 as discharge route 41. Capacitor C21 is discharged via resistor R21 while Zener diode ZD21 is turned off. Accordingly, capacitor C21 is discharged more quickly than a natural discharge of capacitor C21. Accordingly, a voltage across capacitor C21 becomes equal to or lower than lower operation limit Vmin1 by discharging capacitor C21 between the operations of activator 80 to stop voltage conversion circuit 3. In other words, enable voltage Ven applied by starter circuit 4 to enable terminal P34 of voltage conversion circuit 3 is stopped to stop voltage conversion circuit 3. When activator 80 is operated and input voltage Vi exceeds threshold Vth2, enable voltage Ven is applied to enable terminal P34 from starter circuit 4 to start voltage conversion circuit 3. This configuration stabilizes power supplied to load 90 to stabilize the operation of load 90 even when activator 80 is repeatedly operated. Accordingly, in accordance with the embodiment, communication unit 91 of load 90 can send radio signals every time activator 80 is operated when activator 80 is repetitively operated.

Variations

Variation 1

Figure 5:
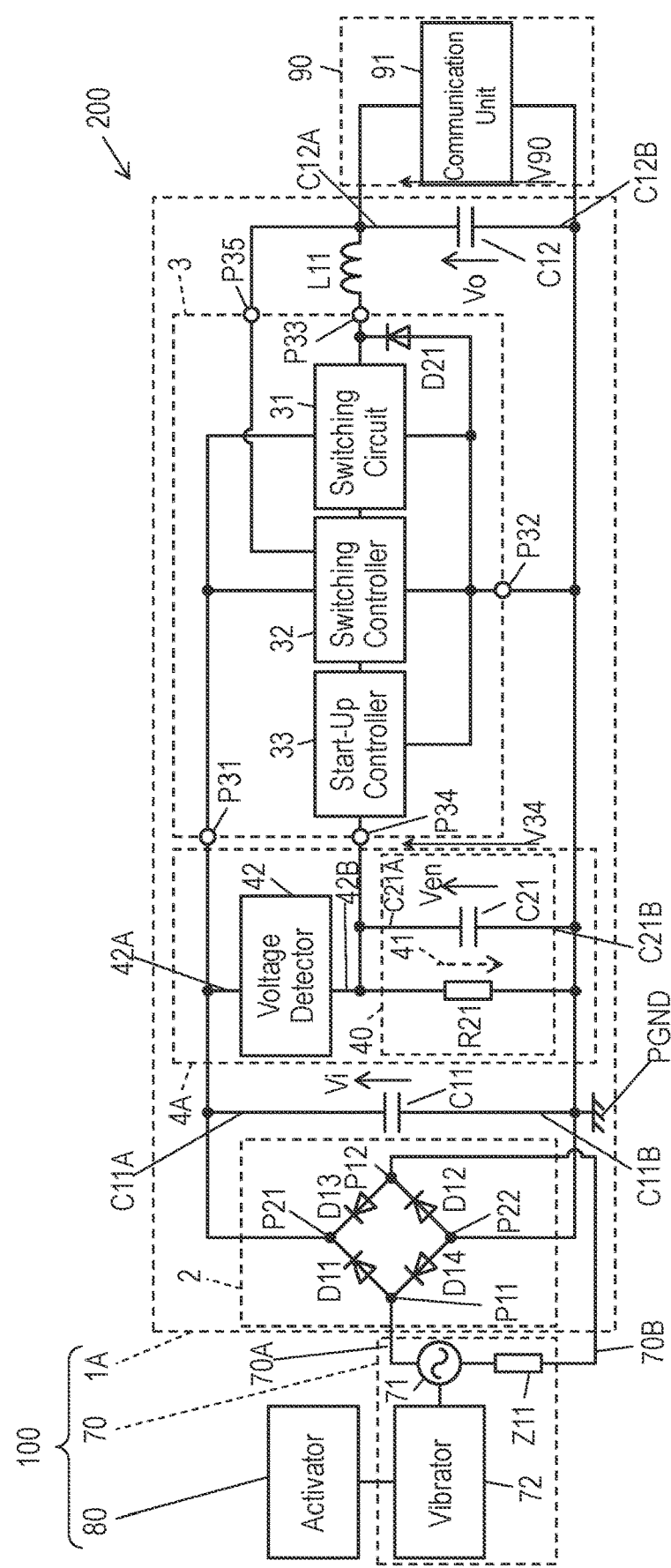
FIG. 5 is a circuit diagram of modified example 1 of a power supply circuit in accordance with the embodiment.

FIG. 5 is a circuit diagram of power supply circuit 1A as n Variation 1 of the embodiment.

Power supply circuit 1A as Variation 1 is different from power supply circuit 1 (FIG. 1A) in accordance with the embodiment in a configuration of starter circuit 4A. Other parts are identical to those of power supply circuit 1 in accordance with the embodiment, and are denoted by the same reference numerals, and their duplicate description will be omitted.

Starter circuit 4A as Variation 1 includes voltage detector 42 instead of Zener diode ZD21. A series circuit of voltage detector 42 and resistor R21 connected in series to each other is electrically connected to both ends C11A and C11B of input capacitor C11. between both ends C11A and C11B of input capacitor C11.

Input terminal 42A of voltage detector 42 is electrically connected to end C11A of input capacitor C11, and output terminal 42B is electrically connected to resistor R21 and capacitor C21 of time constant circuit 40. Voltage detector 42 compares, with predetermined threshold Vth2, input voltage Vi, which is a voltage between both ends C11A and C11B of input capacitor C11. Based on a comparison result of input voltage Vi and threshold Vth2, voltage detector 42 changes a level of an output signal output from output terminal 42B. When input voltage Vi is equal to or higher than threshold Vth2, voltage detector 42 sets the output signal to a high (Hi) level. Accordingly, when input voltage Vi is equal to or higher than threshold Vth2, capacitor C21 is charged by the output signal of voltage detector 42. When input voltage Vi is lower than threshold Vth2, voltage detector 42 sets the output signal to a low (Low) level, which is ground potential lower than the Hi level. Accordingly, capacitor C21 is not charged when input voltage Vi is lower than threshold Vth2.

In power supply circuit 1A as Variation 1, a level of the output signal of voltage detector 42 becomes the Hi level to charge capacitor C21 when input voltage Vi of input capacitor C11 exceeds threshold Vth2. Then, when voltage V34 between both ends C21A and C21B of capacitor C21 exceeds threshold Vth3, voltage V34 is applied to enable terminal P34 as enable voltage Ven, and start-up controller 33 starts switching controller 32. Then, voltage conversion circuit 3 starts voltage conversion to start supplying power to load 90, and communication unit 91 of load 90 operates to send radio signals.

Power supply circuit 1A as Variation 1 starts voltage conversion circuit 3 to start supplying power to load 90 after input capacitor C11 is sufficiently charged, i.e., input voltage Vi reaching equal to or higher than threshold Vth2. This configuration stabilizes power supplied to load 90, and therefore stabilizes the operation of load 90.

Variation 2

Figure 6:
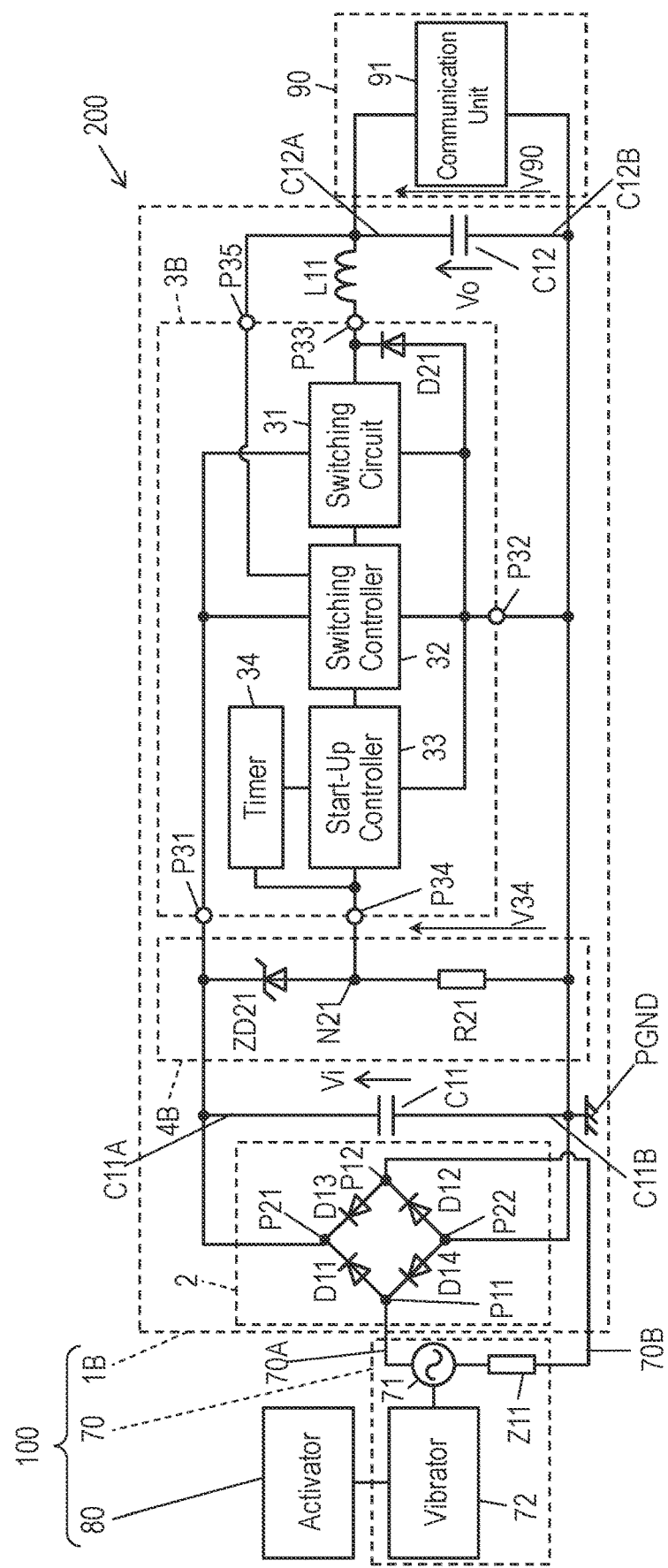
FIG. 6 is a circuit diagram of modified example 2 of a power supply circuit in accordance with the embodiment.

FIG. 6 is a circuit diagram of power supply circuit 1B as Variation 2 according to the embodiment. Power supply circuit 1B as Variation 2 is different from power supply circuit 1 (FIG. 1A) according to the embodiment in a configuration of starter circuit 4B and voltage conversion circuit 3B. Other parts are same as those of power supply circuit 1 in accordance with the embodiment, and are denoted by the same reference numerals, and their duplicate description will be omitted.

Starter circuit 4B as Variation 2 includes Zener diode ZD21 and resistor R21 but does not include capacitor C21. A series circuit of Zener diode ZD21 and resistor R21 connected in series to each other at node N21 is electrically connected between both ends C11A and C11B of input capacitor C11. Node N21 of Zener diode ZD21 and resistor R21 is electrically connected to enable terminal P34 of voltage conversion circuit 3. When input voltage Vi of input capacitor C11 exceeds threshold Vth2 and Zener diode ZD21 is turned on, voltage V34 across resistor R21 is applied to enable terminal P34 of voltage conversion circuit 3 as enable voltage Ven. The resistance of resistor R21 is determined such that a voltage value of voltage V34 (enable voltage Ven) across resistor R21 becomes higher than threshold Vth3.

Voltage conversion circuit 3B in Variation 2 further includes timer 34 in addition to switching circuit 31, switching controller 32, and start-up controller 33.

Timer 34 is configured to start counting time when enable voltage Ven is applied to enable terminal P34. More specifically, when a voltage value of voltage V34 (enable voltage Ven) applied to enable terminal P34 exceeds threshold Vth3, timer 34 starts counting holding period PT2. Holding period PT2 is, for example, 20 msec. In other words, when a voltage value of voltage V34 (enable voltage Ven) applied to enable terminal P34 exceeds threshold Vth3, timer 34 starts measuring time, and ends measurement when measured time reaches holding period PT2.

Start-up controller 33 starts up switching controller 32 when a voltage value of voltage V34 (enable voltage Ven) applied to enable terminal P34 exceeds threshold Vth3, and timer 34 starts counting holding period PT2. Start-up controller 33 maintains the operation state of switching controller 32 while timer 34 is counting holding period PT2. Here, start-up controller 33 maintains the operation state of switching controller 32 while timer 34 is counting holding period PT2, even when a voltage value of voltage applied to enable terminal P34 falls below lower operation limit Vmin1. In other words, start-up controller 33 maintains the operation state of switching controller 32 during counting of holding period PT2 by timer 34 even when application of enable voltage Ven from starter circuit 4 is stopped. Start-up controller 33 stops switching controller 32 after holding period PT2 lapses, i.e., after timer 34 counts holding period PT2. In other words, start-up controller 33 maintains the operation state of switching controller 32 during a period until holding period PT2 lapses from a time point when a voltage value of voltage V34 (enable voltage Ven) applied to enable terminal P34 exceeds threshold Vth3.

Power supply circuit 1B as Variation 2 does not include time constant circuit 40. Therefore, when input voltage Vi falls below threshold Vth2, Zener diode ZD 21 is turned off, and voltage applied to enable terminal P34 decreases to below threshold Vth3. However, for holding period PT2 after voltage applied to enable terminal P34 exceeds threshold Vth3, timer 34 maintains the operation state of switching controller 32. This configuration maintain the operation of voltage conversion circuit 3 and load 90 until holding period PT2 lapses after input voltage Vi falls below threshold Vth2. The length of holding period PT2 counted by timer 34 may be changeable.

For example, by changing a program executed by a processor in timer 34, a time length of holding period PT2 may be changeable. This configuration allows time to maintain the operation of voltage conversion circuit 3 and load 90. Still more, an allowable interval between repetitive operations of activator 80 can be adjusted.

In the above example, timer 34 is integrally configured with voltage conversion circuit 3B. However, timer 34 may be provided separately from voltage conversion circuit 3B.

(Summary)

Power supply circuit (1) according to a first aspect is configured to supply power to load (90) based on power generated by power generation element (70). Power supply circuit (1) includes input capacitor (C11), voltage conversion circuit (3, 3B), and starter circuit (4, 4A, 4B). Input capacitor (C11) is configured to store the power generated by power generation element (70). Voltage conversion circuit (3, 3B) is configured to output, to load (90), output voltage (Vo) obtained by converting input voltage (Vi) between both ends of input capacitor (C11). Starter circuit (4, 4A, 4B) is configured to apply enable voltage (Ven) to enable terminal (P34) of voltage conversion circuit (3, 3B) to start up voltage conversion circuit (3, 3B). Voltage conversion circuit (3, 3B) is configured to output output voltage (Vo) when input voltage (Vi) is equal to or higher than first threshold (Vth1) in an operation state after start-up. Starter circuit (4, 4A, 4B) is configured to apply enable voltage (Ven) to enable terminal (P34) when input voltage (Vi) reaches equal to or higher than second threshold (Vth2) higher than first threshold Vth1).

In this aspect, voltage conversion circuit (3, 3B) starts and performs voltage conversion while input voltage (Vi) is further high. This stabilizes the operation of voltage conversion circuit (3, 3B), and thus power supplied to load (90) can be stabilized.

In power supply circuit (1) according to a second aspect, voltage conversion circuit (3, 3B) according to the first aspect starts when voltage (V34) applied to enable terminal P34 is equal to or higher than third threshold (Vth3) lower than first threshold (Vth1).

In this aspect, voltage conversion circuit (3, 3B) is started by enable voltage (Ven) with a lower voltage value.

In power supply circuit (1) according to a third aspect, starter circuit (4, 4B) in the first or second aspect includes Zener diode (ZD21) electrically connected between both ends of input capacitor (C11).

In this aspect, starter circuit (4, 4B) has a simple configuration, and power consumption by starter circuit (4, 4B) is reduced.

In power supply circuit (1) according to a fourth aspect, starter circuit (4A) in the first or second aspect includes voltage detector (42) electrically connected between both ends (C11A, C11B) of input capacitor (C11).

In this aspect, starter circuit (4A) has a simple configuration, and power consumption by starter circuit (4A) can be further reduced.

In power supply circuit (1) according to a fifth aspect, starter circuit (4, 4A) in one of the first to fourth aspects includes time constant circuit (40) configured to determine voltage-sustaining period (PT1). Starter circuit (4, 4A) is configured to continuously apply enable voltage (Ven) to enable terminal (P34) during voltage-sustaining period (PT1) after input voltage (Vi) falls below second threshold (Vth2).

In this aspect, the operation state of voltage conversion circuit (3, 3B) is maintains even after input voltage (Vi) falls below second threshold (Vth2).

In power supply circuit (1) according to a sixth aspect, time constant circuit (40) in the fifth aspect includes resistor (R21) and capacitor (C21).

In this aspect, time constant circuit (40) has a simple configuration.

In power supply circuit (1) according to a seventh aspect, starter circuit (4, 4A) of the sixth aspect includes a discharge route (41) for discharging capacitor C21.

In this aspect, the time until stopping voltage conversion circuit (3, 3B) after supplying power from voltage conversion circuit (3, 3B) to load (90) is decreased.

In power supply circuit (1) according to an eighth aspect, voltage conversion circuit (3B) of the first to fourth aspects maintains the operation state for holding period (PT2) when enable voltage (Ven) is applied to enable terminal (P34).

In this aspect, the operation state of voltage conversion circuit (3B) even is maintained after input voltage (Vi) falls below second threshold (Vth2).

In power supply circuit (1) according to a ninth aspect, a time length of holding period (PT2) of the eighth aspect is changeable.

In this aspect, time until stopping voltage conversion circuit (3B) after power is supplied from power conversion circuit (3B) to load (90) is adjustable.

In power supply circuit according to a tenth aspect, voltage conversion circuit (3, 3B) of one of the first to ninth aspects is configured to stop outputting output voltage (Vo) when a voltage applied to load (90) reaches upper output limit (Vomax).

In this aspect, the power generation efficiency of power generation element (70) is improved by stopping voltage conversion by voltage conversion circuit (3, 3B) when power consumption by load (90) is relatively small.

Starter circuit (4, 4A, 4B) according to an eleventh aspect is used in power supply circuit (1) of one of the first to tenth aspects.

In this aspect, power supplied to load (90) is stabilized by stabilizing the operation of voltage conversion circuit (3, 3B) of power supply circuit (1).

Power generating device (100) according to a twelfth aspect includes power supply circuit (1) and power generation element (70) of one of the first to tenth aspects.

In this aspect, power supplied to load (90) is stabilized by stabilizing the operation of voltage conversion circuit (3, 3B) of power supply circuit (1).

Electronic apparatus (200) according to a thirteenth aspect includes power generating device (100) and load (90) of the twelfth aspect.

In this aspect, power supplied to load (90) is stabilized by stabilizing the operation of voltage conversion circuit (3, 3B) of power supply unit (1) of power generating device (100).

In electronic apparatus (200) according to a fourteenth aspect, load (90) of the thirteenth aspect sends a signal based on power supplied from power supply circuit (1).

In this aspect, load (90) stably sends signals by stabilizing power supplied from power supply circuit (1) to load (90).

Reference Example

Figure 7:
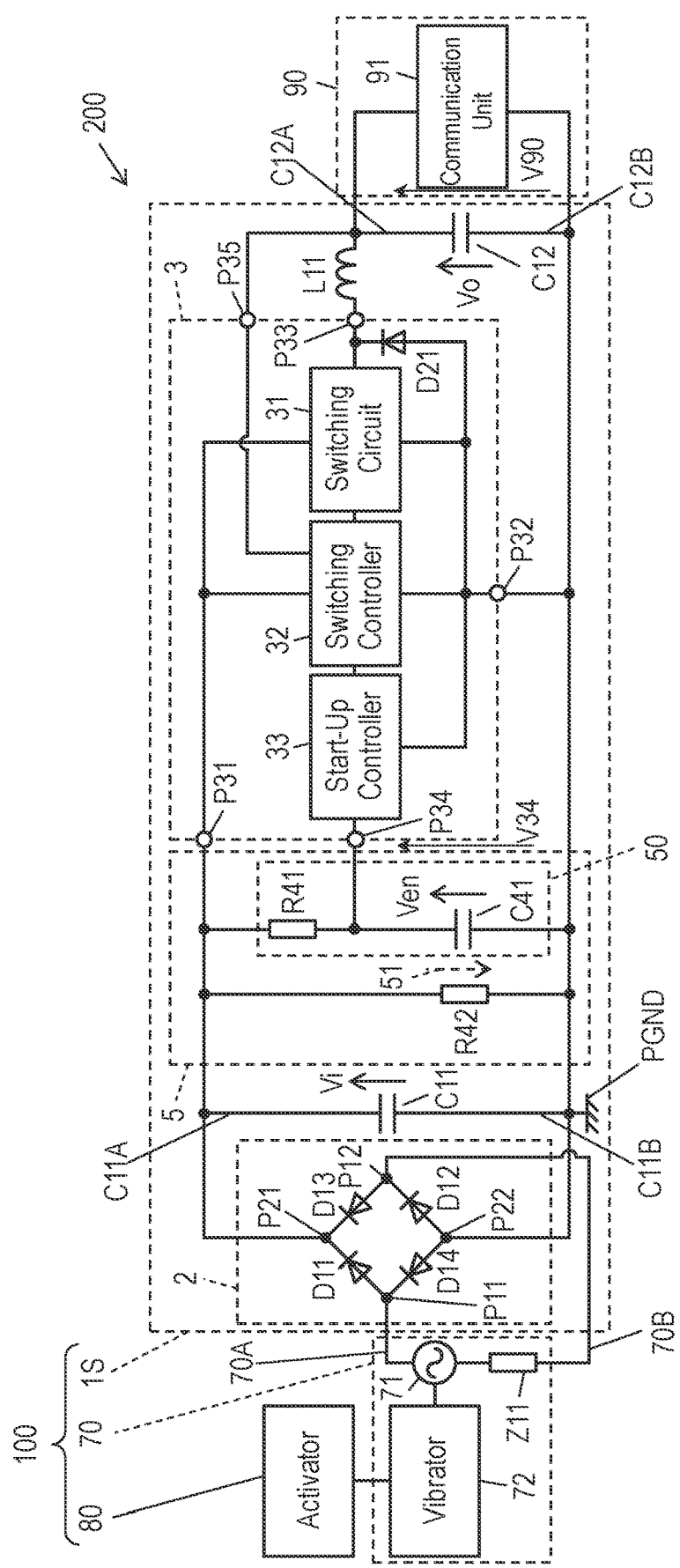
FIG. 7 is a circuit diagram of a reference example of a power supply circuit.

FIG. 7 is a circuit diagram of power supply circuit 1S as a reference example.

A conventional power generating device including vibratable power generation element (power generation element) is disclosed in PTL1 (Japanese Patent Laid-Open Publication No. 2016-86599).

The power generating device disclosed in PTL1 includes a power supply circuit including a storage part, a rectifying circuit, and a DC-DC converter. The storage part stores electrical energy generated by the vibratable power generation element. The rectifying circuit rectifies an AC voltage generated by the vibratable power generation element. The DC-DC converter stabilizes the output voltage of the storage part and outputs the stabilized voltage to a control circuit (load).

In the power supply circuit configured to supply, to the load, power generated by the power generation element, power supplied to the load is required to stabilize.

Power supply circuit 1S as the reference example is configured to supply power to load 90 based on power generated by power generation element 70. Power generating device 100 includes power supply circuit 1S and power generation element 70. Electronic apparatus 200 includes power generating device 100 and load 90. Power generating device 100 is a vibratable power generator that generates power by converting vibration energy applied to power generation element 70 to electrical energy. Load 90 is a device operated by power supplied from power generating device 100.

Power supply circuit 1S as n the reference example further includes input capacitor C11, voltage conversion circuit 3, and starter circuit 5. Power supply circuit 1S as the reference example is different from power supply circuit 1 (FIG. 1A) according to the embodiment in a configuration of starter circuit 5. Other parts are same as that of power supply circuit 1 according to the embodiment, and are denoted by the same reference numerals, and their duplicate description will be omitted.

Starter circuit 5 in the reference example includes delay circuit 50 and resistor R42 (discharge resistor). Delay circuit 50 includes resistor R41 (delay resistor) and capacitor C41 (delay capacitor). A series circuit of resistor R41 and capacitor C41 connected in series to each other is electrically connected to both ends of input capacitor C11 between both ends of input capacitor C11. A voltage across capacitor C41 is applied to enable terminal P34 of voltage conversion circuit 3 as enable voltage Ven.

In power supply circuit 1S as the reference example, delay circuit 50 delays an increase of enable voltage Ven applied to enable terminal P34 of voltage conversion circuit 3 against an increase of input voltage Vi of input capacitor C11. Accordingly, starting of voltage conversion by voltage conversion circuit 3 can be delayed. This configuration stabilizes power supplied to load 90 by stabilizing voltage conversion by voltage conversion circuit 3, accordingly stabilizing the operation of load 90.

Resistor R42 is electrically connected to both ends of input capacitor C11 between both ends of input capacitor C11. Resistor R42 constitutes discharge route 51 for discharging input capacitor C11 and capacitor C41. When power generation element 70 does not generate power, input capacitor C11 is discharged via resistor R42 (discharge route 51). Capacitor C41 is discharged via resistor R41 and resistor R42 (discharge route 51) when power generation element 70 does not generate power.

Accordingly, input capacitor C11 and capacitor C41 are discharged between the operations of activator 80 when activator 80 is repeatedly operated. This configuration decreases a voltage (enable voltage Ven) across capacitor C41 to equal to or lower than lower operation limit Vmin1 to stop voltage conversion circuit 3. Then, voltage conversion circuit 3 starts when activator 80 is operated.

As described above, power supply circuit 1S as n the reference example stabilizes power supplied to load 90 even when activator 80 is repeatedly operated. This can configuration stabilizes the operation of load 90. Accordingly, communication unit 91 of load 90 can send radio signals every time activator 80 is operated while activator 80 is repeatedly operated.

Figure 8:
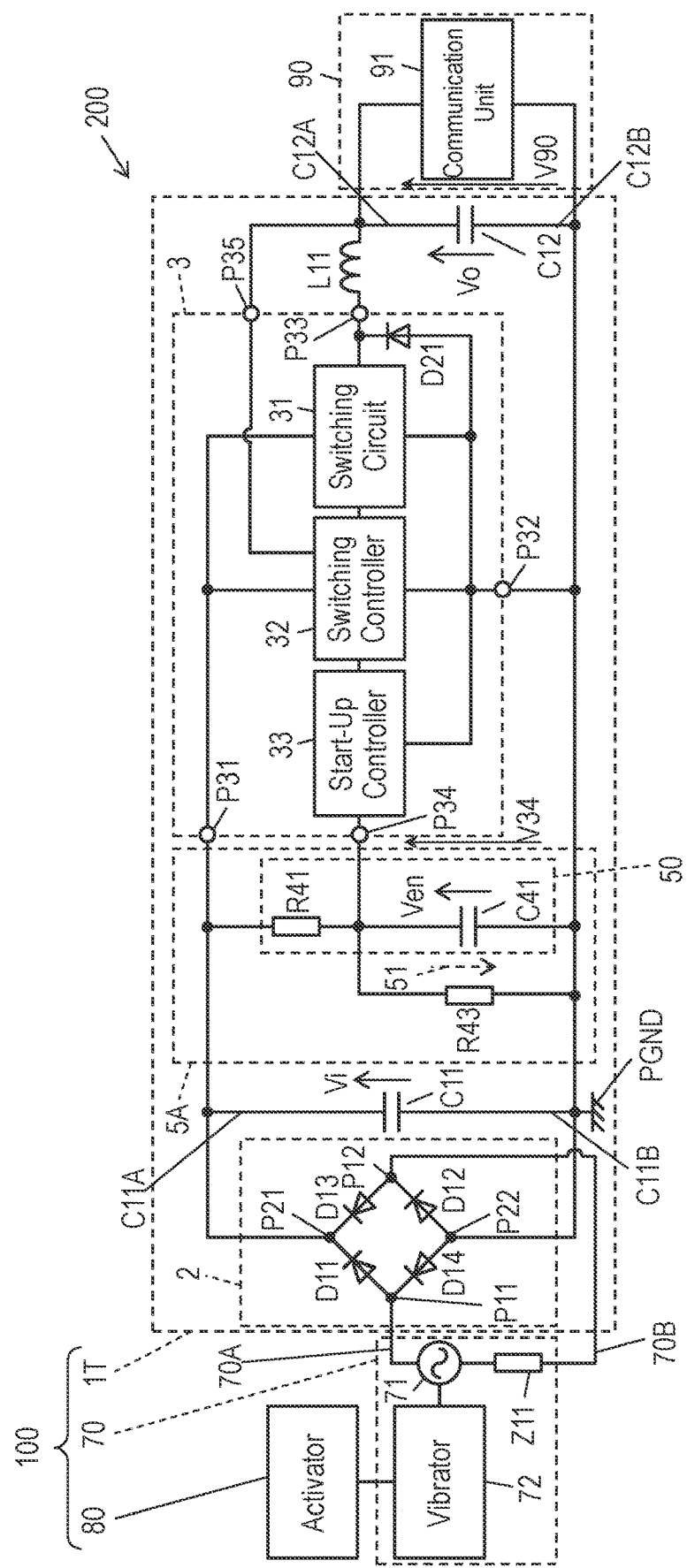
FIG. 8 is a circuit diagram of modified example 1 of the reference example of the power supply circuit.

FIG. 8 is a circuit diagram of power supply circuit 1T in Variation 1 of power supply circuit 1S as n the reference example. Power supply circuit 1T of Variation 1 is different from power supply circuit 1S (FIG. 7) of the above reference example in a configuration of starter circuit 5A. Other parts are identical to those of power supply circuit 1S as the reference example, and are denoted by the same reference numerals, and their duplicate description will be omitted.

Starter circuit 5A includes delay circuit 50 and resistor R43 (delay resistor). Resistor R43 is electrically connected to both ends of capacitor C41 between both ends of capacitor C41 of delay circuit 50. Resistor R43 constitutes discharge route 51 for discharging input capacitor C11 and capacitor C41. When power generation element 70 does not generate power, input capacitor C11 is discharged via resistor R41 and resistor R43 (discharge route 51). Capacitor C41 is discharged via resistor R43 (discharge route 51) when power generation element 70 does not generate power.

In Variation 1, input voltage Vi divided by resistor R41 and resistor R43 is applied to enable terminal P34 of voltage conversion circuit 3. Accordingly, a voltage applied to enable terminal P34 of voltage conversion circuit 3 is reduced. Since a voltage across capacitor C41 becomes small, time required for discharging capacitor C41 can be reduced.

Figure 9:
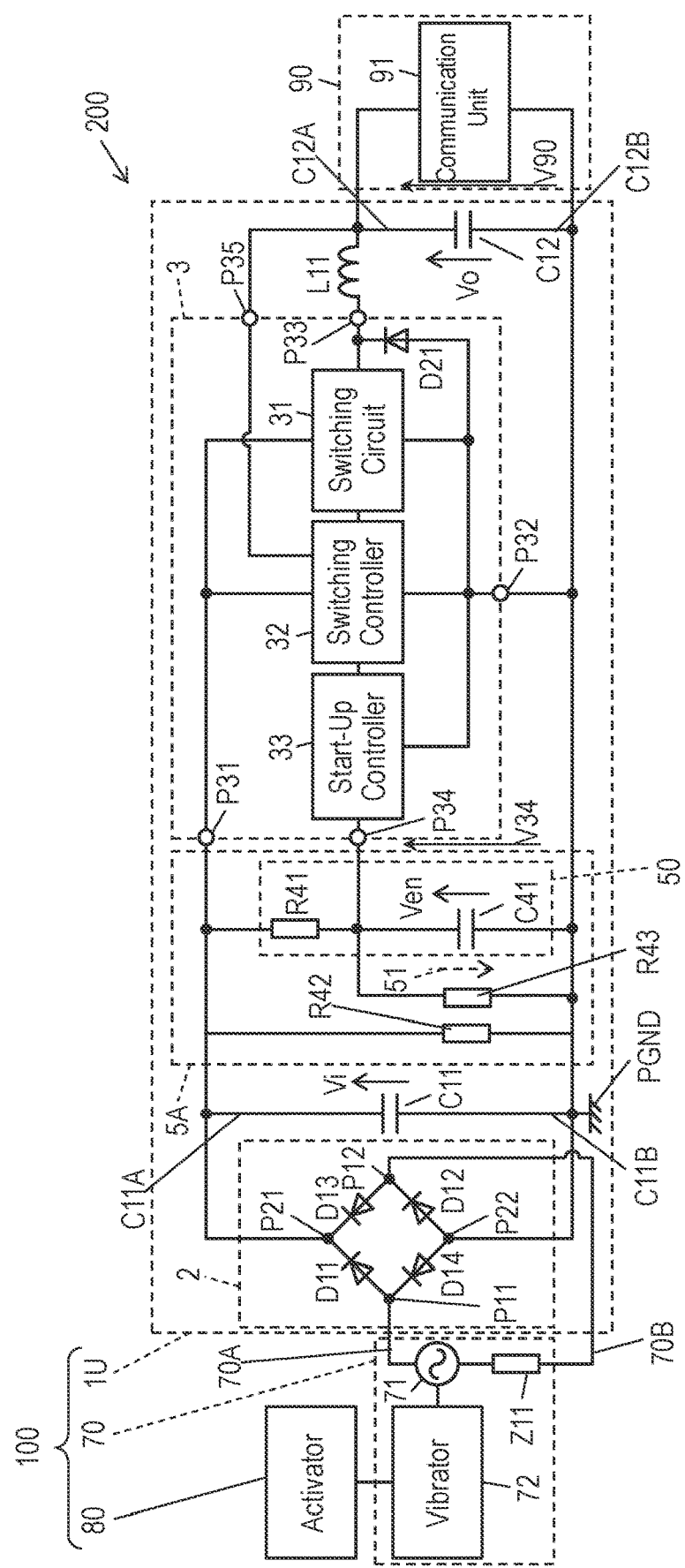
FIG. 9 is a circuit diagram of modified example 2 of the reference example pf the power supply circuit in accordance.

FIG. 9 is a circuit diagram of power supply circuit 1U in Variation 2 of power supply circuit 1S as n the reference example. In power supply circuit 1U as Variation 2, starter circuit 5A includes resistor R42 electrically connected between both ends of input capacitor C11 and resistor R43 electrically connected between both ends of capacitor C41 as discharge route 51. Power supply circuit 1U shown in FIG. 9 has the same effect as power supply circuits 1S and 1T shown in FIG. 7 and FIG. 8.

As described above, power supply circuit (1S) according to a fifteenth aspect supplies, to load (90), power generated by power generation element (70). Power supply circuit (1S) includes input capacitor (C11), voltage conversion circuit (3), and starter circuit (5, 5A). Input capacitor (C11) stores the power generated by power generation element (70). Voltage conversion circuit (3) outputs, to load (90), output voltage (Vo) obtained by converting input voltage (Vi) between both ends of input capacitor (C11). Starter circuit (5) applies enable voltage (Ven) to enable terminal (P34) of voltage conversion circuit (3) to start up voltage conversion circuit (3). Starter circuit (5, 5A) includes delay circuit (50) and discharge route (51). Delay circuit (50) includes a series circuit of delay resistor (R41) and delay capacitor (C41) electrically connected between both ends of input capacitor (C11), and delays an increase of enable voltage (Ven) against an increase of input voltage (Vi). Input capacitor (C11) and delay capacitor (C41) are discharged via discharge route (51).

In this aspect, voltage conversion circuit (3) starts voltage conversion while input voltage (Vi) is further high. This configuration stabilizes power supplied to load (90) by stabilizing the operation of voltage conversion circuit (3).

In power supply circuit (1S) according to a sixteenth aspect, discharge route (51) of the fifteenth aspect includes discharge resistor (R42) electrically connected between both ends of input capacitor (C11).

In this aspect, a duration of time to discharge input capacitor (C11) and delay capacitor (C41) is adjustable according to a resistance value of discharge resistor (R42).

In power supply circuit (1S) according to a seventeenth aspect, discharge route (51) of the fifteenth aspect includes discharge resistor (R43) electrically connected to both ends of delay capacitor (C41) between both ends of delay capacitor (C41).

In this aspect, a duration of time to discharge input capacitor (C11) and delay capacitor (C41) is adjustable according to a resistance value of discharge resistor (R42).

Furthermore, a voltage value of enable voltage (Ven) with respect to input voltage (Vi) can be reduced.

REFERENCE MARKS IN THE DRAWINGS

1 Power supply circuit
3, 3B Voltage conversion circuit
4, 4A, 4B Starter circuit
42 Voltage detector
40 Time constant circuit
41 Discharge route
ZD21 Zener diode
C11 Input capacitor
C21 Capacitor
R21 Resistor
Vi Input voltage
Vo Output voltage
Ven Enable voltage
Vth1 Threshold (first threshold)
Vth2 Threshold (second threshold)
Vth3 Threshold (third threshold)
P34 Enable terminal
70 Power generation element
90 Load
100 Power generating device
200 Electronic apparatus

The invention claimed is:

1. A power supply circuit configured to supply power to a load based on power generated by a power generation element, the power supply circuit comprising:
an input capacitor configured to store the power generated by the power generation element;
a voltage conversion circuit including an enable terminal, the voltage conversion circuit being configured to output, to the load, an output voltage obtained by converting an input voltage between both ends of the input capacitor; and
a starter circuit configured to apply a voltage to the enable terminal of the voltage conversion circuit, wherein
the starter circuit is configured to start up the voltage conversion circuit by applying an enable voltage to the enable terminal of the voltage conversion circuit,
the voltage conversion circuit is configured to output the output voltage in an operating state after starting up when the input voltage is equal to or higher than a first threshold,
the starter circuit is configured to apply the enable voltage to the enable terminal when the input voltage is equal to or higher than a second threshold higher than the first threshold,
the starter circuit includes a Zener diode electrically connected between the both ends of the input capacitor,
the both ends of the input capacitor comprise a first end and a second end with a potential lower than the first end,
a cathode of the Zener diode is connected to the first end of the input capacitor, and
an anode of the Zener diode is connected to the enable terminal.

2. The power supply circuit of claim 1, wherein the voltage conversion circuit is configured to start when a value of the voltage applied to the enable terminal is equal to or higher than a third threshold lower than the first threshold.

3. The power supply circuit of claim 1, wherein
the starter circuit includes a time constant circuit configured to determine a voltage-sustaining period, and
the starter circuit is configured to continuously apply the enable voltage to the enable terminal during the voltage-sustaining period from a time point at which the input voltage equal to or higher than the second threshold falls below the second threshold.

4. The power supply circuit of claim 3, wherein the time constant circuit includes a resistor and a capacitor.

5. The power supply circuit of claim 4, wherein
the capacitor of the time constant circuit is connected in series to the enable terminal and the second end of the input capacitor, and
the resistor of the time constant circuit is connected in parallel to the capacitor.

6. The power supply circuit of claim 1, wherein the starter circuit includes a voltage detector electrically connected to the both ends of the input capacitor between the both ends of the input capacitor.

7. The power supply circuit of claim 1, wherein the voltage conversion circuit is configured to maintain the operating state during a holding period when the enable voltage is applied to the enable terminal.

8. A power generating device comprising:
the power supply circuit of claim 1; and
the power generation element.

9. An electronic apparatus comprising:
the power generating device of claim 8; and
the load.

10. A starter circuit of a power supply circuit configured to supply power to a load based on power generated by a power generation element, wherein
the power supply circuit includes:
an input capacitor configured to store the power generated by the power generation element; and
a voltage conversion circuit including an enable terminal, the voltage conversion circuit being configured to output, to the load, an output voltage obtained by converting an input voltage between both ends of the input capacitor, and
the starter circuit is configured to:
apply a voltage to the enable terminal of the voltage conversion circuit; and
start up the voltage conversion circuit by applying an enable voltage to the enable terminal of the voltage conversion circuit,
the voltage conversion circuit is configured to output the output voltage in an operation state after starting up when the input voltage is equal to or higher than a first threshold,
the starter circuit is configured to apply the enable voltage to the enable terminal when the input voltage is equal to or higher than a second threshold higher than the first threshold,
the starter circuit includes a Zener diode electrically connected between the both ends of the input capacitor,
the both ends of the input capacitor comprise a first end and a second end with a potential lower than the first end,
a cathode of the Zener diode is connected to the first end of the input capacitor, and
an anode of the Zener diode is connected to the enable terminal.

11. A power supply circuit configured to supply power to a load based on power generated by a power generation element, the power supply circuit comprising:
an input capacitor configured to store the power generated by the power generation element;

a voltage conversion circuit including an enable terminal, the voltage conversion circuit being configured to output, to the load, an output voltage obtained by converting an input voltage between both ends of the input capacitor; and a starter circuit configured to apply a voltage to the enable terminal of the voltage conversion circuit, wherein the starter circuit is configured to start up the voltage conversion circuit by applying an enable voltage to the enable terminal of the voltage conversion circuit, the voltage conversion circuit is configured to output the output voltage in an operating state after starting up when the input voltage is equal to or higher than a first threshold, and the starter circuit is configured to apply the enable voltage to the enable terminal when the input voltage is equal to or higher than a second threshold higher than the first threshold, the starter circuit includes:
  a voltage detector electrically connected to the both ends of the input capacitor between the both ends of the input capacitor; and
  a time constant circuit configured to determine a voltage-sustaining period, and the starter circuit is configured to continuously apply the enable voltage to the enable terminal during the voltage-sustaining period from a time point at which a value of the input voltage equal to or higher than the second threshold falls below the second threshold.

12. A starter circuit of a power supply circuit configured to supply power to a load based on power generated by a power generation element, wherein the power supply circuit includes:

an input capacitor configured to store the power generated by the power generation element; and a voltage conversion circuit including an enable terminal, the voltage conversion circuit being configured to output, to the load, an output voltage obtained by converting an input voltage between both ends of the input capacitor, and the starter circuit is configured to:
  apply a voltage to the enable terminal of the voltage conversion circuit; and
  start up the voltage conversion circuit by applying an enable voltage to the enable terminal of the voltage conversion circuit, the voltage conversion circuit is configured to output the output voltage in an operation state after starting up when the input voltage is equal to or higher than a first threshold, the starter circuit is configured to apply the enable voltage to the enable terminal when the input voltage is equal to or higher than a second threshold higher than the first threshold, the starter circuit includes:
  a voltage detector electrically connected to the both ends of the input capacitor between the both ends of the input capacitor; and
  a time constant circuit configured to determine a voltage-sustaining period, and the starter circuit is configured to continuously apply the enable voltage to the enable terminal during the voltage-sustaining period from a time point at which a value of the input voltage equal to or higher than the second threshold falls below the second threshold.

* * * * *